Jan. 2, 1968 H. J. SCHELLSTEDE ET AL 3,360,846
METHOD OF SECURING A COLLAR ON A PIPE
Filed March 15, 1965 3 Sheets-Sheet 1
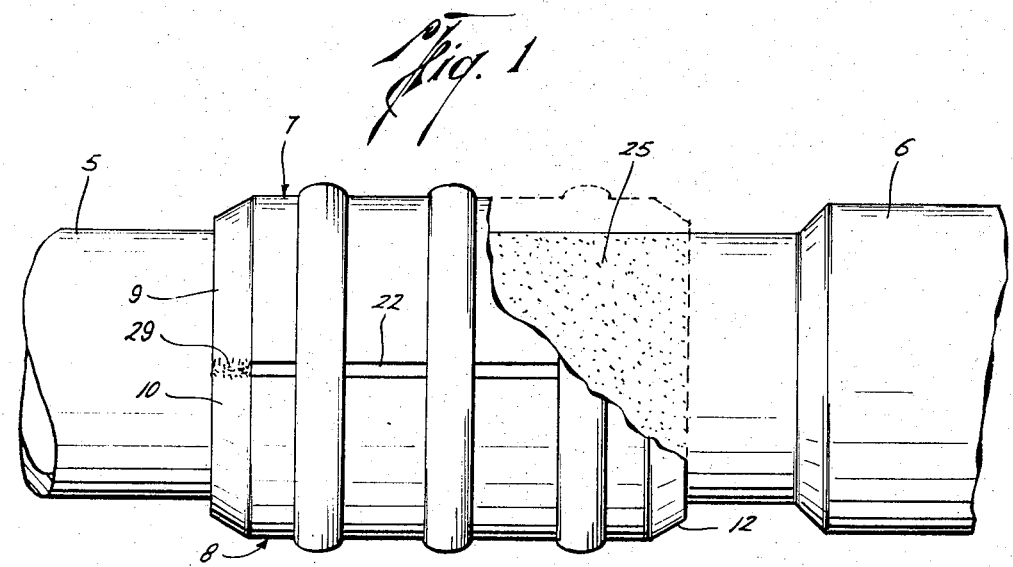
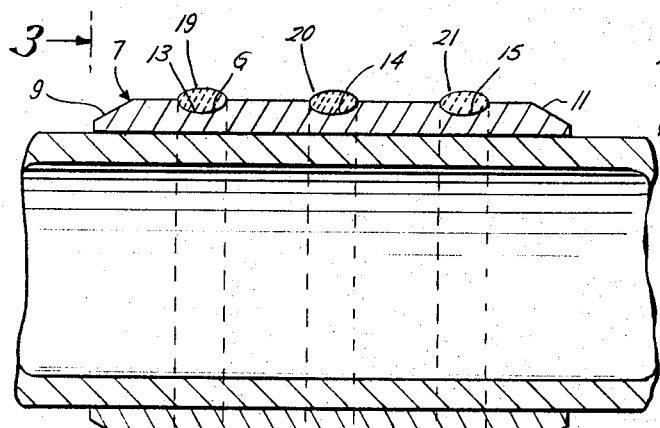
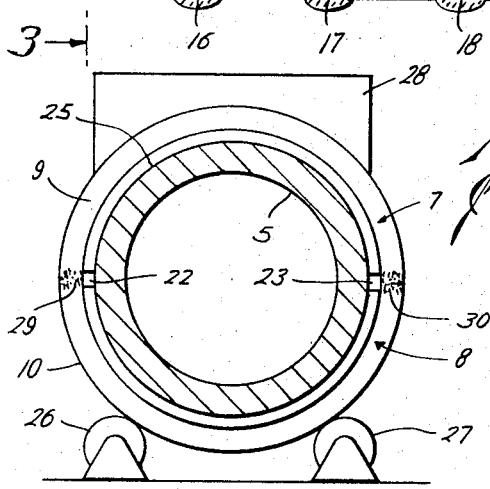
Herman Schellstede
Thomas M. Sanders
INVENTORS
BY Bertrand Mann
ATTORNEY

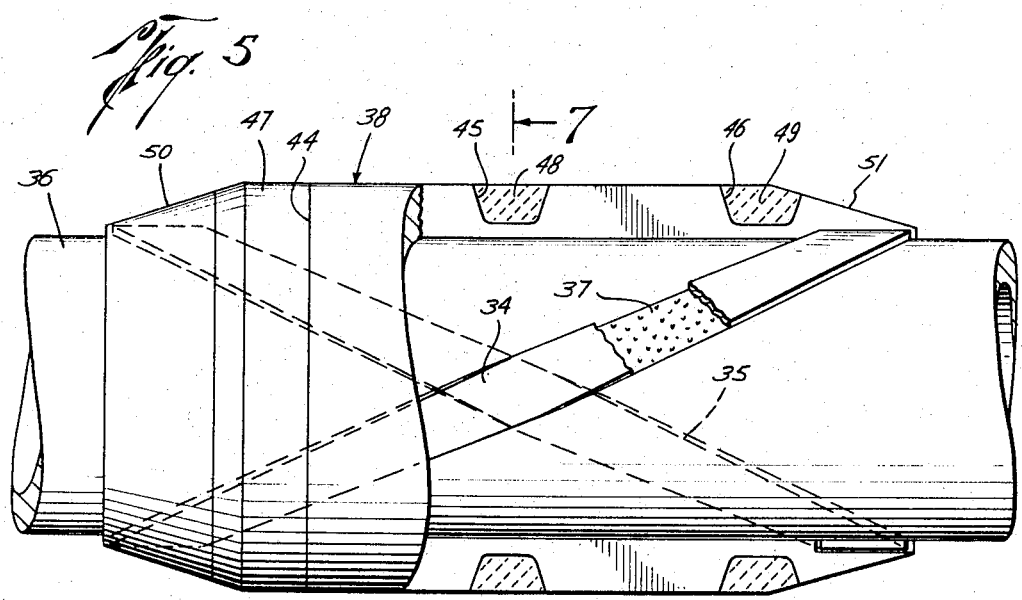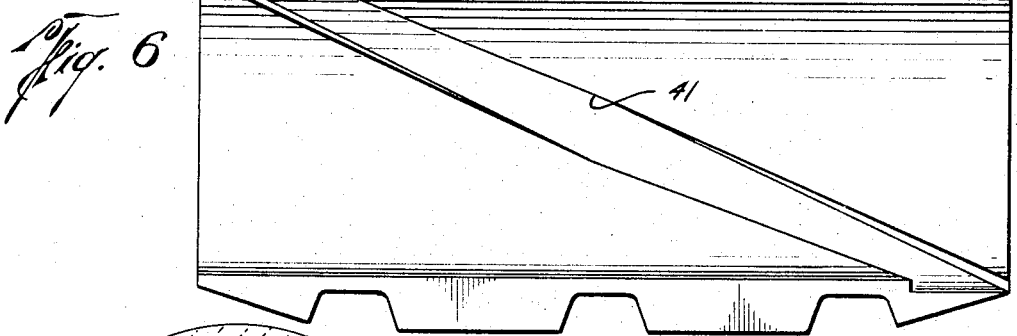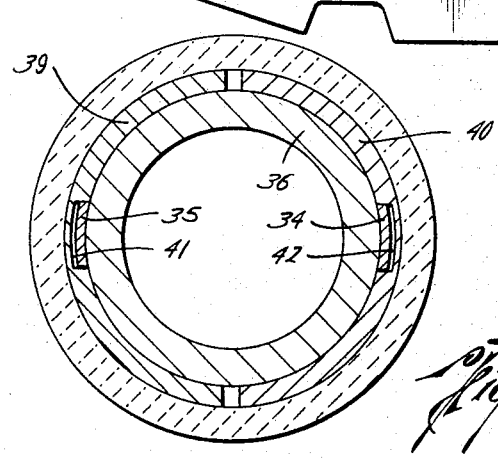

United States Patent Office 3,360,846
Patented Jan. 2, 1968

3,360,846
METHOD OF SECURING A COLLAR ON A PIPE
Herman J. Schellstede, 108 Arthur St., and Thomas M. Sanders, 509 Oak St., New Iberia, La. 70560
Filed Mar. 15, 1965, Ser. No. 440,026
16 Claims. (Cl. 29—447)

ABSTRACT OF THE DISCLOSURE

A protector for drill pipe which consists of a two-piece, longitudinally-split collar is received about a portion of the drill pipe coated with adhesive and is firmly secured to the pipe by the thermal contractive force of one or more annular beads of weld metal laid about the collar. The pipe may be provided with a rib interlocking with the split collar to prevent displacement of the collar on the pipe.

---

This invention relates to the art of securing protectors and other collars upon pipe such as drill pipe used in drilling of oil wells and is a continuation-in-part of our application Ser. No. 335,538 filed Jan. 3, 1964, now abandoned.

In the rotary drilling of oil wells, the long expanse of drill string and, more particularly, the couplings or tool joints which secure together the sections of drill pipe to form the string, frequently rub or strike against the well wall and rapid wear results. Many kinds of pipe protectors have been applied to the pipe sections, but these, generally, have been unsatisfactory since the rugged scraping, twisting, bending, and striking forces applied thereto frequently have displaced the protectors or have broken or severely damaged them. Particularly, the rubber used in some protectors has proven unsatisfactory for withstanding the mechanical as well as corrosive and thermal influences to which the protectors are subjected. It has been impossible, heretofore, to so mount the protector, particularly in the field, in a manner to prevent such dislodgment or damaging.

Accordingly, an object of the present invention is to provide a novel method for attaching a saver or protector collar to a drill pipe or other cylindrical object more securely than has been heretofore possible.

Another object is to provide a novel method of applying a collar to a pipe securely yet without unduly stressing, weakening, or altering the strength or metallurgical characteristics of the pipe itself. Another object is to provide a novel method for firmly securing a collar to a pipe, such as a section of drill string, while increasing the wearing qualities of the collar.

These objects and others hereafter appearing are attained in the practice of the method hereafter described which consists, in a first form, of first coating the pipe with a suitable adhesive material such as an epoxy resin. Thereafter, the collar, which is longitudinally split into two or more sections, is assembled about the coated pipe with longitudinal gaps provided between the opposing edges of the sections. Next, the sections are subjected to heavy radial pressures for equalizing the adhesive material and prestressing the sections which are then tack welded together at the ends. Finally, one or more beads of welding material are laid circumferentially about the sections and then allowed to cool. The resultant contraction of the bead or beads applies strong hoop stresses to the sections which assist the adhesive material in firmly securing the collar in position.

In the accompanying drawing which illustrates the invention

FIG. 1 is a side view showing a collar applied to a pipe in accordance with the present invention, a part of the collar being broken away;

FIG. 2 is a longitudinal section through the structure of FIG. 1;

FIG. 3 is a transverse section taken substantially on line 3—3 of FIG. 2 and showing portions of the machine used in performing the method;

FIG. 4 is similar to FIG. 3 but showing, much exaggerated, a collar segment before the application of radial pressure thereto;

FIG. 5 is an elevation showing a modified, preferred form of the invention, portions being broken away and sectioned to show the underlying structure;

FIG. 6 is an inside view of one of the collar halves in FIG. 5;

FIG. 7 is a section taken on line 7—7 of FIG. 5;

Figure 8:
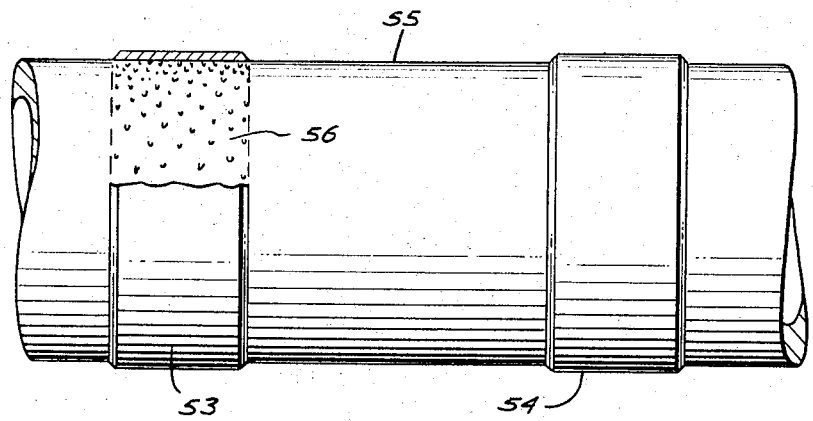
FIG. 8 is an elevation illustrating a further modification, portions being broken away and sectioned.

The figures show a pipe 5, which may be a section of drill pipe conventionally approximately 4½ inches in outside diameter and having a pin end (not shown), and a box or tool joint end 6. The pipe saver or protector collar is longitudinally split diametrically to form a pair of conveniently identical sections 7 and 8 tapered at their ends, as at 9, 10, 11, and 12. Intermediately, the outer surfaces of the sections are provided with circumferential grooves 13, 14, and 15 in section 7 and 16, 17, and 18 in section 8, these registering as shown, to form continuous annular grooves about the assembled sections. These grooves are filled with circumferential beads of welding material 19, 20, and 21 which may extend slightly beyond the outer surface of the collar for resisting wear. The inner surfaces of the collar sections are of such size and shape that, when they are assembled upon the pipe, longitudinal gaps are provided between the opposing edges thereof, as at 22 and 23. FIG. 4 shows a collar section before distortion by radial pressure.

The novel method of securing the collar to a pipe is as follows: the pipe surface to be protected is first cleaned as by sandblasting, and then coated by brushing or spraying with a suitable adhesive such as an epoxy resin, as indicated at 25 in FIG. 1. Since the surface of the pipe may be worn or somewhat out of round, it is desirable that the adhesive have sufficient body to serve also as a filler. Preferably, the pipe surface will be heated sufficiently to insure proper spreading of the adhesive, and such heating also expedites the curing of the bonding material. The collar sections, preferably heated to about 800 degrees F., are then assembled about the coated pipe surface, with the intervening gaps between the opposing side edges equalized, and then subjected to heavy radial pressure, on the order of 7000 p.s.i., for equalizing the distribution of the adhesive-filler material and applying a prestress to the collar sections. Conveniently, the pipe and collar may be mounted for processing in a suitable jig or fixture, which may be a part of the welding machinery, including support rollers 26 and 27. The plunger of the press for applying the radial pressure is illustrated at 28. While the collar sections remain so stressed, the ends thereof are tack welded, as at 29 and 30, and, after hardening of the weld metal, the pressure plunger may be withdrawn.

Next, the weld metal beads 19, 20, and 21 are laid in the circumferential grooves by means of conventional electric welding heads (not shown), the pipe being rotated during the operation. The wire electrode used, preferably, is of low carbon, mild steel and the flux may be of 14½% manganese or Hatfields steel. The pre-heating of the split collar sections serves to reduce the thermal shock incident to this operation and, also, contributes to the firmness of the collar attachment by thermal contraction.

During the application of the welded beads, the pipe should be cooled by circulation of water therethrough, not only to limit the heating of the pipe, but to insure a rapid cooling of the residual flux, thereby, allowing the flux to peel freely during welding. It is desirable to prevent the outer surface of the drill pipe from exceeding a temperature of 400 degrees F., although drill pipe steel of the usual type may be heated to 850 degrees F. without adversely affecting the physical prpoerties thereof. The O.D. of the welded beads is reduced by machining which raises the hardness of the beads from 221 Brinell units to 360 Brinell units. This weld steel will harden further during service in the hole to the order of 550 Brinell units. Finally, the excess epoxy binding material is removed and the collar is ready for service.

In initial construction, the inner surface of the collar may have a diameter slightly less than the nominal O.D. of the pipe for which the collar is intended. A reduction in I.D. of .040 inch of a collar designed for 4½ inch O.D. drill pipe is sufficient so that when the collar is split longitudinally and assembled about the pipe, substantially uniform longitudinal gaps approximately 1/16 inch will be provided between the opposing edges of the collar sections. These gaps accommodate slight variations in the diameter and shape of the pipe surface. Furthermore, the slightly reduced diameter of the collar, with the incident change in diameter of the collar inner surface, results in elastic flexing of the collar sections, upon the application of radial pressure thereto, to insure extremely tight gripping of the pipe. This gripping action is enhanced by contraction of the metal of the welded annular beads. Since the tack welded collar sections form a continuous annulus, the thermal contraction occurring as the sections cool also produces pipe gripping action. The welded beads should be free of cracks and should have great tensile strength and a large amount of ductility.

In a collar of 15 inch length designed for application to a 4½ O.D. drill pipe, we have found the following proportions exemplary: The middle ring or bead 20 is located at the longitudinal center of the collar. The centers of rings 19 and 21 are each 3 9/16 inches from the center of ring 20. Tapers 9, 10, 11, and 12 at the ends of the collar are each 2 7/16 inches long. The O.D. of the collar is 6 inches and a 1/16 inch annular face is provided at each end of the collar. As stated, if the I.D. of the collar is .040 less than the nominal O.D. of the pipe, the circumference of the inner surface of the collar will be sufficiently less than that of the outer surface of the pipe to provide the 1/16 inch gap between the opposing edges of the collar sections. However, the I.D. of the collar, initially, may be made the same as the nominal O.D. of the pipe and a slight amount of metal removed from the edges of the collar sections to provide for these gaps, which should be uniform in the assembly. The circumferential grooves in the collar are approximately semi-elliptical in section and 1½ inches in width and ½ inch in depth.

An important advantage of the herein-disclosed collar attaching method lies in the longitudinal gradation of hoop stresses applied to the pipe and particularly in the gradual reduction of such stresses from the outer beads toward the ends of the collar. This has the effect of eliminating or greatly reducing the sharp change in hoop stresses which would be applied to the pipe where, for instance, a solid (non-split) collar is fixed on the pipe as by thermal contraction and/or bonding. This is important in avoiding damage to the pipe in case of blows, bending, twisting, or other stresses applied to the pipe or collar in service. The durability of the collar attachment is much greater than where, for instance, an epoxy binding material alone is relied upon for this purpose. The initial heating of the collar sections and/or the pipe serves to speed up the curing of the epoxy binding material, a desirable feature for field application of the collars. We have found that this curing operation can be reduced from on the order of 24 hours to 1 hour by such pre-heating.

While the metal rings themselves may be of such character as to add substantially to the wear resisting qualities of the collar, it would also be feasible to utilize the welded beads merely for the application of hoop stresses to the collar sections and to coat or cap these beads with wear resistant material, for instance, carbide. The circumferential welds are more easily applied than are longitudinal welds which could be utilized in securing together split sections at the longitudinal gaps 22 and 23. We have found that such longitudinal welds are not necessary. The beads may be applied with the use of currently available welding machines which support and rotate the pipe, it being only necessary to mount the three welding heads so as to properly position the beads with respect to the collars.

In some instances, the above procedures may not result in sufficiently secure mounting of a protector on a drill pipe to resist the rugged blows and abrasions to which the protector is subjected. For instance, where the protector is retained in operation in a well for an excessive period, its outer surface, including the weld beads 19, 20, and 21, may become so worn as to reduce the hoop stresses exerted by the beads sufficiently to permit the collar to be slid along the pipe in an undesirable manner. Accordingly, applicants have provided for more positive affixation of the collar.

Theoretically, it should be possible to form a positive stop on the collar by inserting a stop ring or key in a suitable groove or other recess in the drill pipe. However, such grooving or recessing is difficult to make, particularly in the field, and drillers object to such removal of metal from their pipe with the resultant weakening effect. Furthermore, it would be possible to weld the collar to the pipe in a sufficiently firm manner. However, drill pipe is subjected in operation to many different stresses, e.g., torsional, tensional, bending, and even compressive, such that pipe of maximum strength characteristics is required. Standard welding operations results in substantial heat penetration of the base or work piece so as to form a metallurgical weld, e.g., provide an actual intermingling of the weld metal and that of the work piece. Such heating of the work piece above its critical temperature adversely affects the metallurgical and strength characteristics of the pipe so that its durability is reduced unless the pipe is subjected to suitable counteracting heat treatment after the welding step. The intermingling of weld and work piece metal is known as dilution. Oxyacetylene welding provides for relatively low dilution, but the metal deposition rate is excessively low. Electric welding procedures, on the other hand, in general produce excessive dilution (and, thus, weakening of the base pipe).

Recently, procedures have been devised for depositing molten metal on the roughened surface of a work piece in such a manner as to form a strong mechanical bond between the two without substantial dilution and, therefore, without adversely affecting the strength characteristics of the work piece. In the so-called metal spraying or plating procedure, powdered metal is fed through a suitable nozzle onto the roughened area of the work piece to be plated or built up. An electric arc is maintained in the nozzle across the path of the powdered metal so that this metal is melted before it reaches the work piece. Adherence of the weld metal to the roughened or pitted base or work piece creates a strong mechanical bond without heating the work piece above its critical temperature.

Another somewhat similar procedure is known as plasma arc welding in which powdered metal is fed through a nozzle structure located adjacent the work somewhat as in metal spraying. However, an arc is maintained between the nozzle and the work for melting the fed powder as it approaches the work. In both cases, it is important that the melting point of the weld metal be lower than that of the work piece so that only a very thin layer or none at all of the surface of the work piece will be melted. The arc supporting current is controlled so as to insure the maintenance of the work piece below its critical temperature while melting the weld powder.

FIGS. 5, 6, and 7 illustrate method steps in which a pair of half helical, oppositely disposed and inclined positive stop ribs 34 and 35 are applied to the surface of the drill pipe section 36. The outer surface of the drill pipe, preferably the area thereof to be covered by ribs 34 and 35, is first roughened as at 37 as by grit blasting or a suitable roughing tool before the weld metal is applied thereto. The welding nozzle will make sufficient passes to build the ribs 34 and 35 to the proper height, after which these ribs will be machined as desired. Overlay less than than .075 inch thick can be made by the above described processes.

The protector collar 38 is formed in longitudinal halves 39 and 40 which may be of less radius than the outer surface of the pipe and provided with sufficient clearance between their longitudinal edges to permit the halves to be drawn tightly about the pipe section. The inner faces of the halves are provided with half helical slots 41 and 42 which generally conform to the positioning and shape of ribs 34 and 35 but are slightly deeper and wider for freely receiving these ribs when the collar halves are assembled about the pipe. The outer surfaces of the collar halves are provided with annular grooves 44, 45, and 46 in which are laid weld metal beads 47, 48, and 49, as in the first form. These beads upon cooling apply great hoop stresses to the collar halves so as to draw them tightly about the pipe section. Where the stop ribs or like structures are used, it may not be necessary to cement the collar to the pipe. The ends of the collar are provided with tapers 50 and 51 of substantial length for reducing stress concentrations and the end weld beads 47 and 49 are formed in part on or overlap these tapers. After the beads are laid they may be machined as shown, flush with the surface of the collar. The helical dispositions of the ribs 34 and 35 is for the purpose of increasing the ductility of the mechanically bonded weld metal.

In preparation for mounting of a collar, an area four to six inches from each end of the pipe saver will be plated with the weld material selected. Due to the extreme flexing and twisting to which drill pipe is subjected in use, a metal of high ductility and relatively noncorrodible must be used in forming the positive stop ribs. A wide variety of metals having high ductility and low corrodibility—for instance, copper, aluminum, bronze, zinc, and yellow brass—can be furnished in powdered form and, in fact, some of such metals cannot be conveniently supplied in rod form for standard electric welding procedures. Moreover, the geometric shape of the positive stop ribs is important, and that shown in FIGS. 5 through 7 has resulted from a fatigue study of drill pipe. In this form, the pipe saver will not appreciably change the stress conditions in the pipe near the saver. Thus, the pipe saver serves merely as a wear buffer and not a stiffening member.

FIG. 8 shows somewhat different forms of positive stop collars 53 and 54 which are mechanically bonded to the pipe and are machined to the shape shown. The O.D. of the drill pipe section 55 is preliminarily roughened or pitted as shown at 56 to insure a good mechanical bond.

Figure 9:
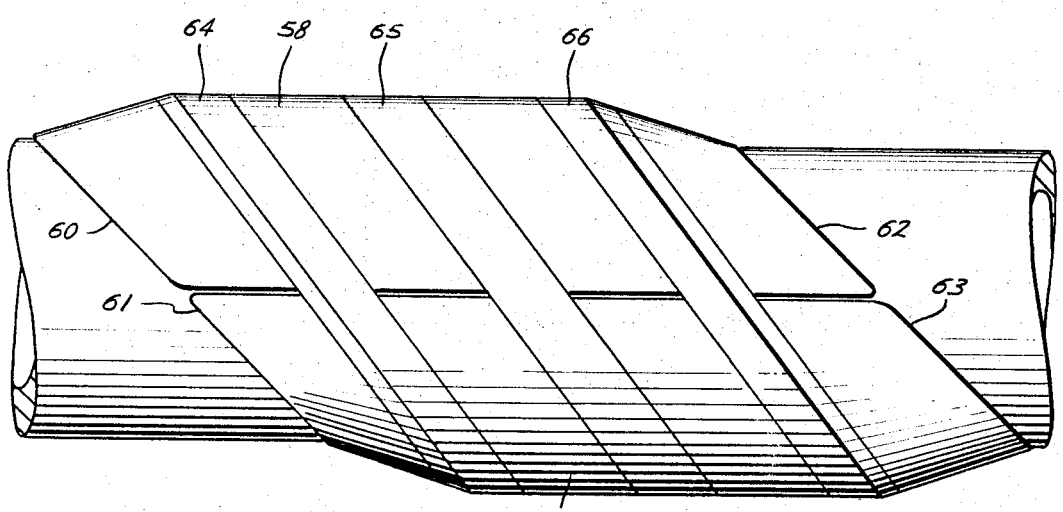
FIG. 9 is an elevation showing still another form, the pipe and collar being rotated 90 degrees with respect to FIGS. 5 and 8.

The form in FIG. 9 has protector or saver collar halves 58 and 59 with their ends inclined to the axis of the pipe as at 60, 61, 62, and 63, respectively, and in alignment. The external weld beads 64, 65, and 66 are parallel to the collar edges as means to further reduce stress concentrations in the saver and drill pipe during operation.

The novel method results in fixing a collar much more firmly to a pipe or other cylindrical object than has been possible heretofore. While the novel method is especially advantageous in the application of saver or protector collars to drill pipes, it may be used, of course, in the affixing of collars for other purposes—for instance, a collar which cooperates with a spider or elevator used in running the drill stem into a well or removing the same therefrom.

The invention may be modified in various other respects as will occur to those skilled in the art, and the exclusive use of all modifications as come within the scope of the appended claims is contemplated.

We claim:

1. The method of providing a collar on a cylindrical member which comprises forming a collar of axially split sections, assembling said sections cylindrically about the member, applying a hot metal ring circumferentially about the assembled sections, and cooling said ring to cause shrinkage thereof for setting said collar on the member.

2. The method of securing a collar on a pipe which comprises forming a collar of axially split sections and with its inner surface generally conforming in curvature to the pipe surface, assembling said sections cylindrically about the pipe with opposing edges of the sections spaced slightly apart, applying a ring of hot metal snugly about the assembled sections, and cooling said ring to cause contraction thereof and firm attachment of the collar to the pipe.

3. The method of securing a collar to a pipe which comprises forming at least one longitudinal split in the collar, applying the collar about the pipe, the inner surface of said collar being of a circumference at least slightly less than the outer circumference of the pipe so that the opposing edges of the collar are spaced apart in the assembly, applying a ring of hot metal about the collar, and cooling said ring to contract the same and firmly secure the collar on the pipe.

4. The method of securing a collar on a pipe which comprises splitting the collar longitudinally, coating the pipe with an adhesive, assembling the split collar sections about the adhesive coated pipe with longitudinal gaps provided between the opposing edges of said sections, applying radial pressure to said sections to hold the same in assembled position and apply pre-stress thereto, applying a ring of molten weld metal about said sections, and cooling said ring to contract the same and firmly secure said collar sections to the pipe.

5. The method of securing a collar on a pipe which comprises forming a collar slightly less in inner circumference than the outer circumference of the pipe, longitudinally splitting the collar into at least two separate sections, coating the pipe with combination filler and adhesive material, assembling said sections about the coated pipe with longitudinal gaps between the sections, applying strong radial pressure to the sections to equalize said material, to hold the sections assembled, and to pre-stress the sections, applying a ring of molten metal about the assembled sections, and cooling the ring to contract the same and firmly secure said sections to the pipe.

6. The method described in claim 5 in which the ends of said sections are tapered to reduce the pressure gradients at the ends of the collar.

7. The method described in claim 5 in which a plurality of rings are applied about the assembled sections.

8. The method of securing a collar to a pipe which comprises forming a collar of longitudinally split sections, securing the sections about the pipe with longitudinal gaps between the sections, laying a bead of molten welding metal circumferentially about the sections, and cooling said bead to contract the same and thereby apply hoop stresses to the sections for firmly securing the same to the pipe.

9. The method described in claim 8 in which the pipe is coated with adhesive material prior to assembly of said sections thereon.

10. The method described in claim 8 in which said sections are heated prior to the application of said welding bead to reduce the thermal shock incident to the bead laying operation.

11. The method described in claim 9 including the further step of applying strong radial pressure to the assembled sections, prior to application of the welding bead, to temporarily hold the assembly, to equalize the adhesive material, and to pre-stress the sections.

12. The method described in claim 8 in which the split sections are initially secured about the pipe by tack welding.

13. The method described in claim 8 in which said welding beads are formed of wear resistant material for reducing wear on the outer surface of the collar.

14. The method of providing a metal collar on a cylindrical metal member which comprises forming the collar of axially split sections, forming an outward stop projection on the cylindrical member and a correspondingly shaped and positioned recess in the inner surface of at least one of said sections, securing the sections about the member with said projection received in said recess, applying a band of molten metal about said sections, and cooling said band to tightly secure said sections to said member by contraction of said band.

15. The method described in claim 14 in which a portion of the surface of said member is roughened and molten metal is applied to said surface portion and then cooled to form said stop projection.

16. The method described in claim 14 in which the molten metal applied to said roughened surface portion has a melting temperature which is lower than the critical temperature of said member.

References Cited

UNITED STATES PATENTS

| | | |
|---|---|---|
| 2,671,641 | 3/1954 | Hinkle. |
| 2,922,721 | 1/1960 | Tarkan et al. |
| 3,129,504 | 4/1964 | Ivan et al. _____ 29—529 |
| 3,193,918 | 7/1965 | Heldenbrand _____ 29—447 |

FOREIGN PATENTS 623,430   7/1961   Canada.

CHARLIE T. MOON, *Primary Examiner.*